(12) United States Patent
Haskins et al.

(10) Patent No.: US 9,296,485 B2
(45) Date of Patent: Mar. 29, 2016

(54) DISTRIBUTING GAS WITHIN AN AIRCRAFT

(71) Applicant: AIRBUS OPERATIONS LIMITED, Bristol (GB)

(72) Inventors: Richard Haskins, Bristol (GB); Timothy Leigh, Bristol (GB)

(73) Assignee: Airbus Operations Limited, Bristol (GB)

( * ) Notice: Subject to any disclaimer, the term of this patent is extended or adjusted under 35 U.S.C. 154(b) by 104 days.

(21) Appl. No.: 14/297,152

(22) Filed: Jun. 5, 2014

(65) Prior Publication Data
US 2014/0366950 A1 Dec. 18, 2014

(30) Foreign Application Priority Data
Jun. 12, 2013 (GB) .................... 1310439.3

(51) Int. Cl.
B64D 37/00 (2006.01)
B64D 37/04 (2006.01)
B64D 37/08 (2006.01)
B64D 37/32 (2006.01)

(52) U.S. Cl.
CPC .............. *B64D 37/005* (2013.01); *B64D 37/04* (2013.01); *B64D 37/08* (2013.01); *B64D 37/32* (2013.01); *Y02T 50/44* (2013.01); *Y10T 137/0391* (2015.04); *Y10T 137/2196* (2015.04)

(58) Field of Classification Search
USPC ........... 244/135 R, 135 A, 1 R; 181/142, 184, 181/206; 381/86
See application file for complete search history.

(56) References Cited

U.S. PATENT DOCUMENTS

| 2006/0288866 A1* | 12/2006 | Cleckler | F41B 15/00 95/78 |
| 2007/0245802 A1* | 10/2007 | Austerlitz | G01N 29/024 73/24.01 |
| 2009/0103989 A1* | 4/2009 | Relin | F04B 35/04 406/12 |
| 2010/0276225 A1* | 11/2010 | Busse | B64D 33/06 181/198 |
| 2011/0133033 A1 | 6/2011 | Surawski | |
| 2012/0055735 A1* | 3/2012 | Lu | G10K 11/26 181/252 |
| 2012/0193479 A1 | 8/2012 | Roscoe et al. | |

FOREIGN PATENT DOCUMENTS

DE 202010010399 9/2010

OTHER PUBLICATIONS

Search Report for GB 1310439.3 dated Dec. 10, 2013.

* cited by examiner

*Primary Examiner* — J. Woodrow Eldred
(74) *Attorney, Agent, or Firm* — Nixon & Vanderhye P.C.

(57) ABSTRACT

An aircraft comprising a Rubens' tube for distributing gas within the aircraft. The Rubens' tube comprises a tube with a plurality of outlets; an inlet for feeding the gas into the tube; and a loudspeaker arranged to set up a standing acoustic wave within the tube. Typically the Rubens' tube is arranged to feed inert gas into a fuel tank of the aircraft.

15 Claims, 6 Drawing Sheets

DISTRIBUTING GAS WITHIN AN AIRCRAFT

This application claims priority to GB 1310439.3 filed 12 Jun. 2013, the entire contents of which is hereby incorporated by reference.

FIELD OF THE INVENTION

The present invention relates to a method and apparatus for distributing gas within an aircraft. The invention may be used to distribute inert gas into one or more fuel tanks of the aircraft, although it is not limited to such use.

BACKGROUND OF THE INVENTION

The distribution of inert gas in conventional aircraft is controlled by the careful positioning of outlets around the tank. There is no dynamic control of the outlet flow at any of the positions during operation, which leads to a non-optimised solution.

SUMMARY OF THE INVENTION

A first aspect of the invention provides an aircraft comprising a Rubens' tube for distributing gas within the aircraft, wherein the Rubens' tube comprises a tube with a plurality of outlets; an inlet for feeding the gas into the tube; and a loudspeaker arranged to set up a standing acoustic wave within the tube.

A second aspect of the invention provides a method of distributing gas within an aircraft, the method comprising feeding gas into a tube with a plurality of outlets along its length, and setting up a standing acoustic wave within the tube in order to control a flow of the gas from the tube out of the outlets.

A Rubens' tube is an apparatus conventionally used as a teaching aid to demonstrate standing waves within a tube. The invention uses such a tube to provide a method and apparatus for distributing gas within an aircraft which enables dynamic control without requiring individual valves at each outlet of the tube. This results in a weight saving compared with a system requiring individual valves at each outlet of the gas supply system, and is thus particularly suited to use within an aircraft in which weight savings are particularly important. Note that when a Rubens' tube is used as a teaching aid then the gas is typically ignited to provide a line of flames visually demonstrating the differential flow rate from the outlets. When used in the present invention the gas will typically not be ignited in this way.

Typically the aircraft comprises one or more fuel tanks and the Rubens' tube is arranged to feed inert gas into the fuel tank(s). However the invention is not limited to such use, and may be used for other aircraft systems. For instance the Rubens' tube may be used to control the flow of air from an air conditioning system into a cabin of the aircraft, for example enabling an increased flow of cool air into a galley compartment when the in-flight meal is being served. Alternatively the Rubens' tube may be used to control the flow of cool air onto an air-cooled avionics rack, focusing the cool air onto different parts of the rack depending on operational requirements.

In its most basic mode of operation, the Rubens' tube may be operated at a single wavelength only. In this case then optionally the Rubens' tube may be operated in one mode in which a standing acoustic wave is set up in order to generate a non-uniform distribution pattern of flow of the gas out of the outlets, and also in a second mode in which no standing wave is set up so that gas flows out of the outlets relatively uniformly.

Preferably the Rubens' tube is operated at different wavelengths to set up different flow distribution patterns between the outlets. In this case the method comprises setting up a first standing acoustic wave at a first wavelength in a first operating mode in order to generate a first distribution pattern of flow of the gas out of the outlets; and setting up a second standing acoustic wave at a second wavelength in a second operating mode which is different to the first wavelength in order to generate a second distribution pattern of flow of the gas out of the outlets which is different to the first distribution pattern.

The method typically comprises distributing the gas in a first operating mode in which gas flows out of a pair of the outlets with a first flow ratio between the outlets; and then setting up a standing acoustic wave within the tube in order to switch to a second operating mode in which gas flows out of the pair of the outlets with a second flow ratio between the outlets which is different to the first flow ratio. Standing waves of different wavelengths may be set up in the first and second operating modes, or no standing wave may be present in the first operating mode.

In the case where the Rubens' tube is arranged to feed inert gas into one or more fuel tanks, then the first and second operating modes may be employed during different phases of flight of the aircraft. For instance one operating mode may be used during ascent and the other during descent.

The outlets are typically distributed with a non-uniform spacing along a length of the tube. This enables the spacing to be chosen to match (or avoid) the positions of the nodes of some standing waves.

The inlet and loudspeaker may be at the same end of the tube, or more preferably they are at opposite ends of the tube.

A further aspect of the invention provides an aircraft fuel tank system comprising one or more fuel tanks; and a Rubens' tube arranged to feed inert gas into the fuel tank(s), wherein the Rubens' tube comprises a tube with a plurality of outlets; an inlet for feeding inert gas into the tube; and a loudspeaker arranged to set up a standing acoustic wave within the tube.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
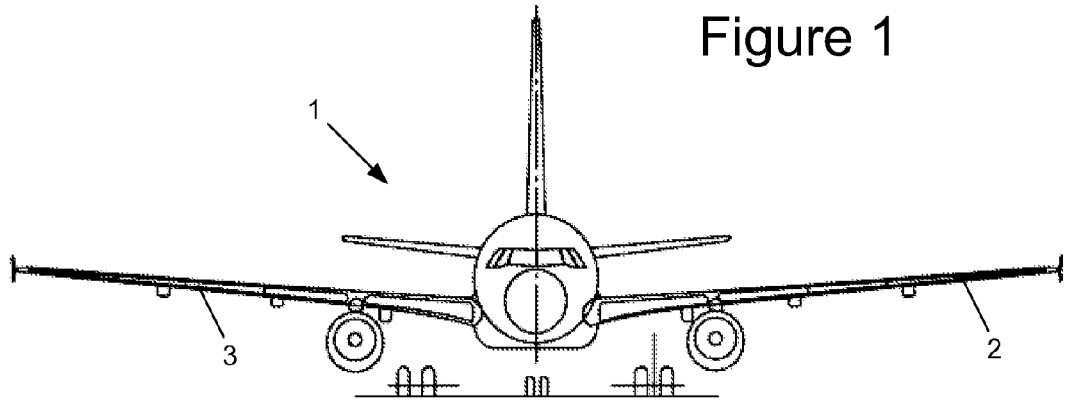
FIG. 1 is a front view of an aircraft.
Figure 2:
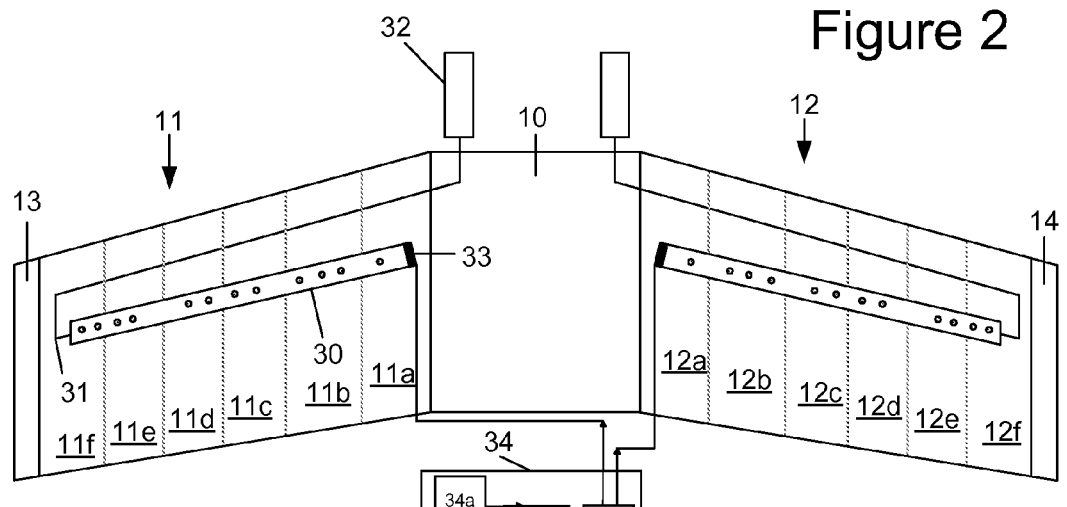
FIG. 2 is a schematic plan view of the aircraft's fuel tanks.

An aircraft 1 shown in FIG. 1 comprises a port wing 2 and a starboard wing 3. The aircraft has three fuel tanks shown schematically in plan view in FIG. 2: a centre wing tank 10 under the fuselage, a port wing tank 11 within the port wing 2, and a starboard wing tank 12 within the starboard wing 3. Each wing also has a vent tank 13,14 at its outboard end.

The wing tanks 11,12 are divided into compartments 11a-11f and 12a-12f. The ribs dividing these compartments have passages which allow fuel to flow across them.

Figure 3:
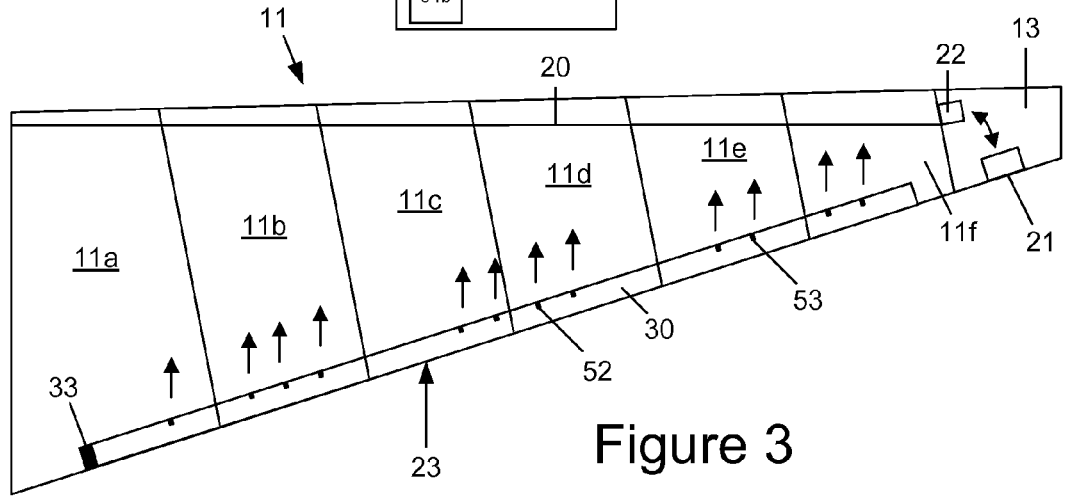
FIG. 3 is a front view of the port wing tank when the loudspeaker is inactive.

FIG. 3 is a view of the port wing tank 11 viewed from the front. The wing tank is shown filled with fuel 20. The vent tank 13 contains an external vent 21 between the vent tank 21 and the outside of the wing, and an internal vent 22 between the vent tank 13 and the outboard compartment 11f of the wing tank 11. As the aircraft ascends and the pressure outside the tank drops, gas from the ullage of the wing tank exits via the vents 21,22. Similarly as the aircraft descends and the pressure outside the tank drops, air enters the ullage via the vents 21,22.

A Rubens' tube 23 is provided for distributing inert gas within each wing tank. Only port wing tank 11 is shown in FIG. 3 but an equivalent Rubens' tube is installed in the starboard wing tank 12. The Rubens' tube comprises a tube 30 with a straight centre line and a plurality of outlets along its length—in this case twelve outlets. An inlet 31 is provided at the outboard end of the tube 30 and connected to an inert gas supply 32 for feeding inert gas into the tube. The inert gas is typically nitrogen enriched air.

A loudspeaker 33 is coupled to the opposite inboard end of the tube and can be driven by a controller 34 at a variable wavelength set by the controller 34 to set up a standing acoustic wave within the tube.

The controller 34 has an avionics component 34c that can receive inputs from a fuel gauging system 34a and an onboard flight computer 34b. The fuel gauging system 34a provides data on the fuel level in the tanks and the flight computer 34b provides data on flight phase, ascent/descent, aircraft attitude etc. The input data is used by the avionics component 34c to drive a signal generator processor 34d to generate an appropriate acoustic signal according to flight conditions. The acoustic signal drives the loudspeaker 33 to set up a standing acoustic wave within the tube 30.

Figure 4:
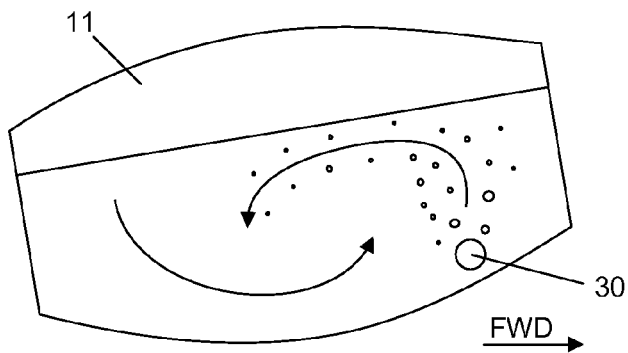
FIG. 4 is a sectional view of the wing tank showing the sparging action of the gas.

The tube 30 is positioned towards the bottom of the wing tank 11 and runs from the furthest inboard compartment 11a to the furthest outboard compartment 11f so that it is immersed in fuel along all or some of its length. The gas flowing into the fuel creates bubbles which tend to rotate within the fuel as shown in FIG. 4, dehydrating the fuel as well as removing dissolved oxygen (a process known as sparging) and saturating the fuel with nitrogen.

When the loudspeaker 33 is inactive, inert gas flows out of the outlets with a relatively uniform distribution pattern of flow as shown by the arrows in FIG. 3. In this operating mode the rate of flow of inert gas out of each outlet is approximately the same.

Figure 5:
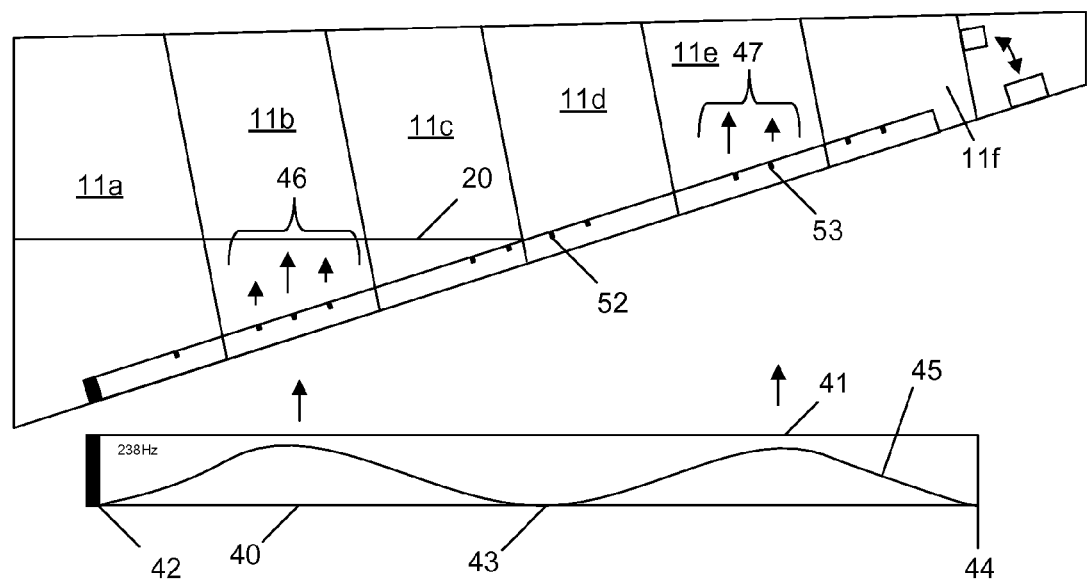
FIG. 5 is a front view of the port wing tank when the loudspeaker is setting up a standing wave at 238 Hz.

Consider now an operating mode shown in FIG. 5 in which the loudspeaker 33 is driven at 238 Hz and excites a standing acoustic wave within the tube with a pair of nodes at positions 40 and 41 and three anti-nodes at positions 42-44. Based on Bernouilli's principle, the flow out of each outlet is proportional to the average of the square root of the pressure difference across the outlet. A graphical representation of this average is indicated by a line 45 in FIG. 5. This average of the square root of the pressure difference is greater at the nodes 40,41 than at the anti-nodes 42-44, resulting in a non-uniform distribution pattern of flow of the gas out of the outlets. So as shown in FIG. 5 gas 46,47 tends to flow out of the outlets near the nodes 40,41 at a greater rate than the outlets near the anti-nodes 42-44.

The uniform flow pattern of FIG. 3 may be used during climb of the aircraft when the tanks are fairly full and warm, gas is following out of the ullage via the vent tank 13, and it is desirable to feed as much inert gas as possible into the fuel. The non-uniform flow pattern of FIG. 5 may be used during descent of the aircraft when the tanks are cold and relatively empty and air is flowing into the ullage via the vent tank 13. In this case it is desirable to feed relatively more inert gas 47 into the outboard compartments 11e,11f near the vent 22, since this will prevent the oxygen concentration in these compartments from increasing due to the influx of oxygen rich air from the vent 22. Gas 46 continues to flow into the inboard compartment 11b to sparge the fuel 20 which is now at a relatively low level. There is less flow (or even zero flow) into the mid-span compartments 11c and 11d since they are near the anti node 43.

Figure 6:
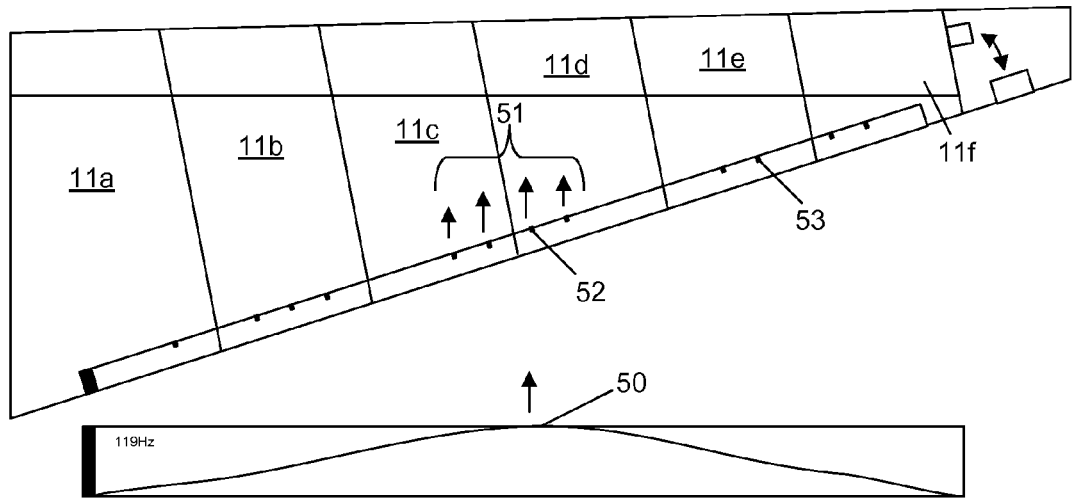
FIG. 6 is a front view of the port wing tank when the loudspeaker is setting up a standing wave at 119 Hz.

FIG. 6 shows an alternative operating mode in which the loudspeaker is driven at 119 Hz resulting in a standing wave with only a single node 50 which creates a high flow 51 into the mid-span compartments 11c, 11d and a relatively low (or zero) flow into the others.

The flow rate of each outlet is a function of the area of the outlet and the average of the square root of the pressure difference across the outlet. If we consider an exemplary pair of outlets (for example an outlet 52 into the mid-span compartment 11d and an outlet 53 into the outboard compartment 11e) and assume that they have the same area, then in the operating mode of FIG. 3 the inert gas flows out of the pair of the outlets with a first flow ratio between the outlets (a ratio of approximately 1), in the operating mode of FIG. 5 gas flows out of the pair of the outlets with a second flow ratio between the outlets (a ratio less than 1) and in the operating mode of FIG. 6 gas flows out of the pair of the outlets with a third flow ratio between the outlets (a ratio greater than 1).

Figure 7:
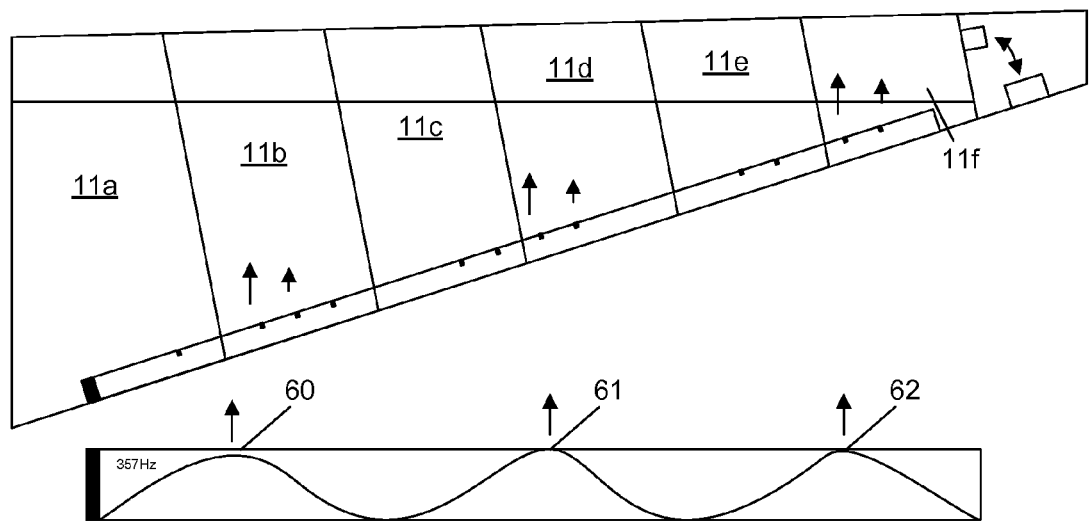
FIG. 7 is a front view of the port wing tank when the loudspeaker is setting up a standing wave at 357 Hz.

FIG. 7 shows an alternative operating mode in which the loudspeaker is driven at 357 Hz resulting in a standing wave with three nodes 60-62 which creates high flow into the compartments 11b, 11d, 11f and relatively low (or zero) flow into the others.

Figure 8:
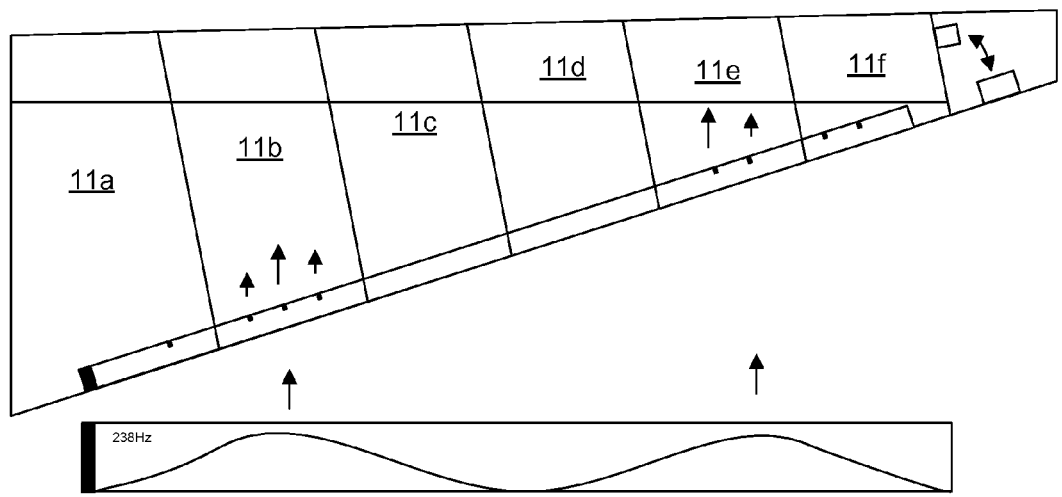
FIG. 8 is a front view of the port wing tank when the loudspeaker is setting up a standing wave at 238 Hz with a different arrangement of outlets.

FIG. 8 shows an alternative arrangement of outlets. In this case the tube has outlets in the inboard and outboard compartments 11a, 11b, 11e, 11f but none in the mid-span compartments 11c, 11d. When the loudspeaker 33 is driven at 238 Hz as shown in FIG. 8 then it drives inert gas into the fuel as shown. When it is driven at 119 Hz then there will be relatively little flow into the fuel tank since there are no outlets near the single mid-span node in this case.

Figure 9:
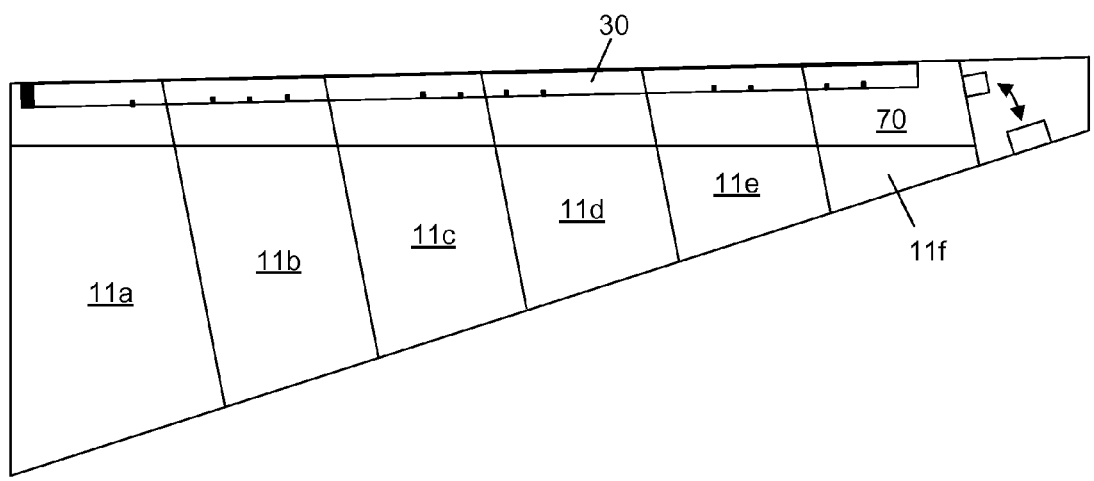
FIG. 9 is a front view of the port wing tank with the Rubens' tube in an alternative position.

FIG. 9 shows an alternative arrangement in which the Ruben's tube 30 runs along the top of the wing tank rather than the bottom. In this case the tube 30 is not immersed in fuel (unless the tank is full) so the inert gas is fed into the ullage 70 rather than into the fuel.

Figure 10:
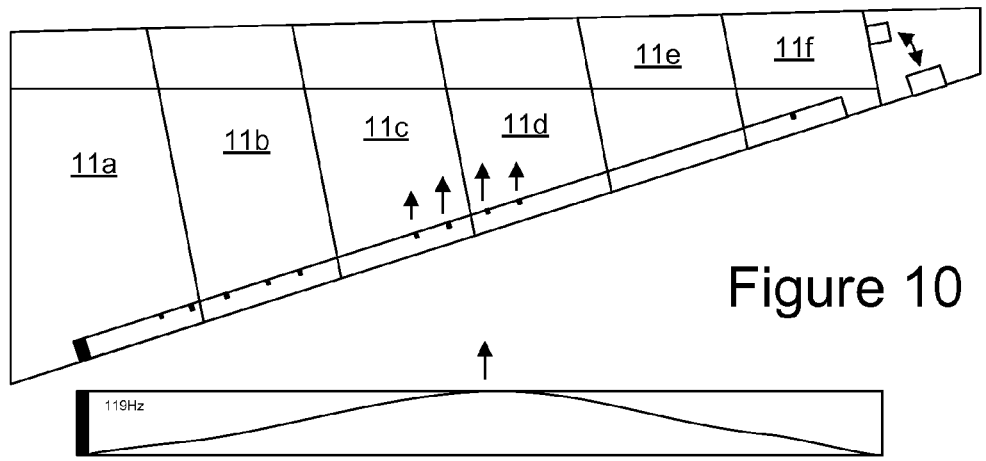
FIGS. 10-12 are front views of the port wing tank showing a further alternative arrangement of outlets and different standing waves.
Figure 11:
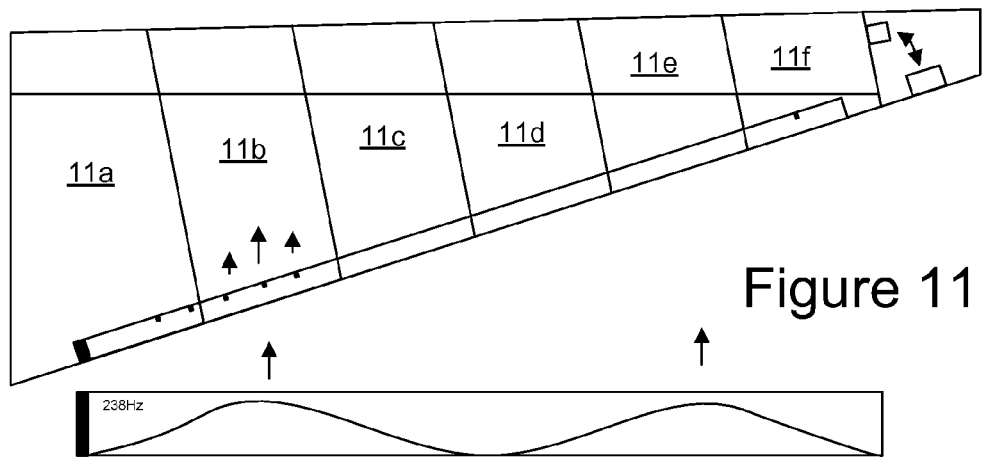
Figure 12:
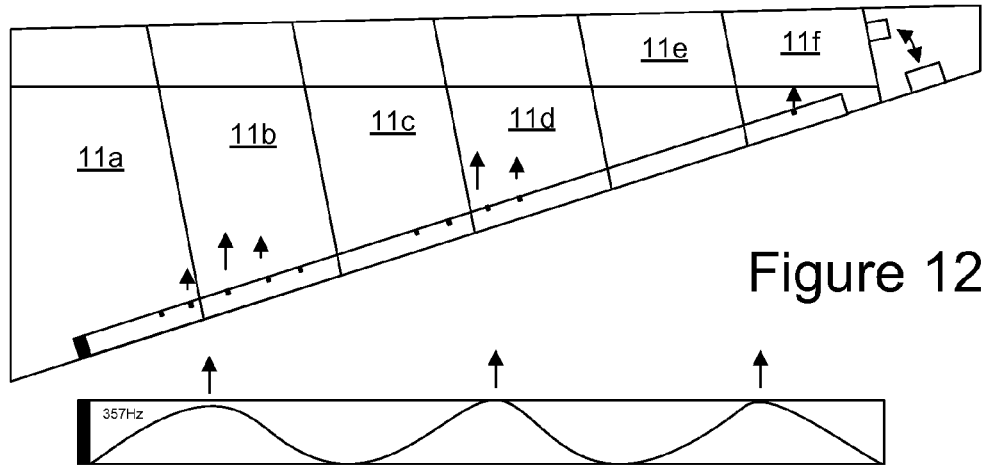

FIGS. 10-12 show a further alternative arrangement of outlets and their associated operating modes. The tube has only a single outlet in the compartment 11f and no outlets in the compartment 11e. It also has two outlets in the inboard compartment 11a rather than one. The flow patterns for 119 Hz, 238 Hz and 357 Hz are shown in FIGS. 10-12 respectively.

Figure 13:
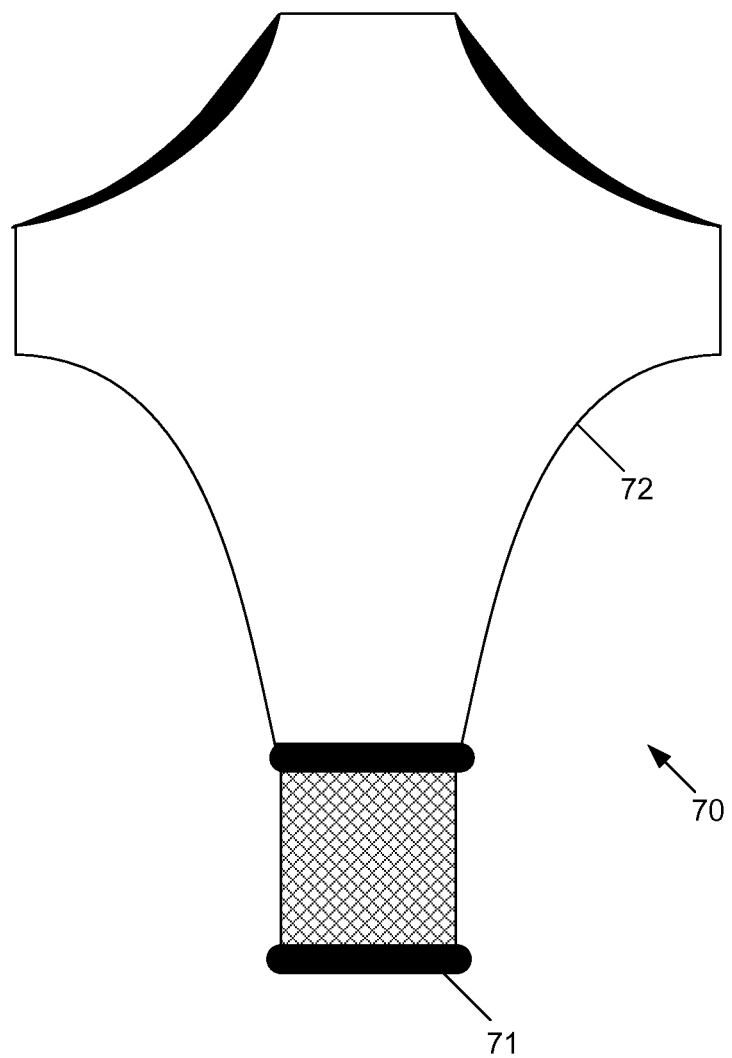
FIG. 13 show a non-return valve.

Optionally each outlet of the Rubens' tube may have a non-return valve 70 shown in FIG. 13 which permits gas to flow out of the tube but prevents gas from flowing back into the tube. The valve comprises a tube section 71 and a rubber "duck bill" portion 72 which opens with internal pressure but closes when external pressure is greater.

Although the invention has been described above with reference to one or more preferred embodiments, it will be appreciated that various changes or modifications may be made without departing from the scope of the invention as defined in the appended claims.

The invention claimed is:

1. An aircraft comprising a Rubens' tube for distributing gas within the aircraft, wherein the Rubens' tube comprises a tube with a plurality of outlets; an inlet for feeding the gas into the tube; and a loudspeaker arranged to set up a standing acoustic wave within the tube.

2. The aircraft of claim 1 comprising one or more fuel tanks, wherein the Rubens' tube is arranged to feed inert gas into the fuel tank(s).

3. The aircraft of claim 1 wherein the outlets are distributed with a non-uniform spacing along a length of the tube.

4. The aircraft of claim 1 further comprising a controller arranged to drive the loudspeaker at a variable wavelength set by the controller.

5. An aircraft fuel tank system comprising one or more fuel tanks; and a Rubens' tube arranged to feed inert gas into the fuel tank(s), wherein the Rubens' tube comprises a tube with a plurality of outlets; an inlet for feeding inert gas into the tube; and a loudspeaker arranged to set up a standing acoustic wave within the tube.

6. The system of claim 5 wherein the outlets are distributed with a non-uniform spacing along a length of the tube.

7. The system of claim 5 further comprising a controller arranged to drive the loudspeaker at a variable wavelength set by the controller.

8. A method of distributing gas within an aircraft, the method comprising feeding gas into a tube with a plurality of outlets along its length, and setting up a standing acoustic wave within the tube in order to control a flow of the gas from the tube out of the outlets.

9. The method of claim 8 wherein the tube is arranged to feed inert gas into one or more fuel tank of the aircraft.

10. The method of claim 8 comprising setting up a first standing acoustic wave at a first wavelength in a first operating mode in order to generate a first distribution pattern of flow of the gas out of the outlets;

and setting up a second standing acoustic wave at a second wavelength in a second operating mode which is different to the first wavelength in order to generate a second distribution pattern of flow of the gas out of the outlets which is different to the first distribution pattern.

11. The method of claim 8 comprising distributing the gas in a first operating mode in which gas flows out of a pair of the outlets with a first flow ratio between the outlets; and then setting up a standing acoustic wave within the tube in order to switch to a second operating mode in which gas flows out of the pair of the outlets with a second flow ratio between the outlets which is different to the first flow ratio.

12. The method of claim 11 wherein a standing wave of different wavelengths is set up in the first and second operating modes.

13. The method of claim 11 wherein no standing wave is present in the first operating mode.

14. The method of claim 8 wherein the first and second operating modes are employed during different phases of flight of the aircraft.

15. The method of claim 8 wherein one of the operating modes is used during ascent of the aircraft and the other during descent of the aircraft.

\* \* \* \* \*